United States Patent [19]

Speirs et al.

[11] Patent Number: 5,677,603
[45] Date of Patent: Oct. 14, 1997

[54] LIGHTING SYSTEM FOR AN AIRCRAFT CABIN

[75] Inventors: Jonathan Laycock Speirs, Edinburgh, Scotland; Anthony Roy Fozard, London, England

[73] Assignee: British Airways PLC, Middlesex, England

[21] Appl. No.: 362,407

[22] Filed: Dec. 23, 1994

[30] Foreign Application Priority Data

Aug. 4, 1994 [GB] United Kingdom ............... 9415933

[51] Int. Cl.$^6$ ............... B60Q 3/00; B60Q 3/02; F21C 9/02; G02B 5/00
[52] U.S. Cl. ............... 315/324; 315/316; 315/77; 362/62; 362/348; 362/32; 362/293; 244/118.5
[58] Field of Search ............... 362/17, 18, 61, 362/16, 348, 62, 75, 32, 293; 307/10.8; 315/324, 76, 77, 307, 316, 317, 318, 291; 244/118.5; 359/889, 890; 250/227.11

[56] References Cited

U.S. PATENT DOCUMENTS

| | | | |
|---|---|---|---|
| 4,704,660 | 11/1987 | Robbins | 362/32 |
| 4,800,474 | 1/1989 | Bornhorst | 362/293 |
| 5,149,187 | 9/1992 | Matsuno et al. | 362/80 |
| 5,206,562 | 4/1993 | Matsuno et al. | 315/77 |
| 5,282,091 | 1/1994 | Grabowski et al. | 362/61 X |

Primary Examiner—Robert Pascal
Assistant Examiner—Arnold Kinkead
Attorney, Agent, or Firm—Sterne, Kessler, Goldstein & Fox P.L.L.C.

[57] ABSTRACT

The lighting system for an aircraft cabin includes multiple illuminating units for distribution about a cabin. Each illuminating unit includes at least one variable light source providing light of a known characteristic and that is energizeable independently of other illuminating units. A controller controls energization of the illuminating units by way of dimming and switching units associated respectively with the illuminating units. The controller is operable to create different predetermined combinations of energizations of the illuminating units so that a desired lighting scene is created within the cabin by the energized illuminating units. The controller is arranged to effect a gradual transition to the energizations of the illuminating units when changing from one predetermined combination to another. As a result, there is a corresponding gradual change between scenes created in the cabin.

34 Claims, 4 Drawing Sheets

LIGHTING SYSTEM FOR AN AIRCRAFT CABIN

BACKGROUND OF THE INVENTION

1. Field of the Invention

The invention relates to a lighting system for an aircraft cabin.

2. Related Art

Lighting systems that are presently provided in aircraft cabins tend to create a harsh environment within the cabin. The systems generally comprise only one or two different means of illumination, for example overhead fluorescent tubes which cast light down through diffusers, concealed lamps which are directed upwardly so that light is reflected from the ceiling of the cabin and/or concealed lamps which are directly downwardly so that light is reflected from the walls of the cabin. Illuminating the cabin ceiling and walls in this way tends to emphasis the uniformity of ceiling and walls and to present an impersonal atmosphere within the cabin. Furthermore, the control of the lighting systems is generally by way of a simple switching arrangement by which sets of lights can only be switched either on or off. The control over the illumination within the cabin is therefore limited.

During a flight it is often necessary to adjust the level of illumination within the cabin. For example, during a medium or long haul flight it may be necessary to adjust from a level of maximum illumination say during take off of the aircraft, to softer levels say when meals are being served and eaten, to minimal levels during say the showing of films or sleep periods. Indeed, it may be desirable to simulate a full 24 hour cycle with periods of both "day" and "night". Whilst it is possible to adjust levels of illumination in existing systems by selectively switching on and off different sets of lights, this level of control is less than satisfactory, making it very difficult, if not impossible, to achieve a realistic simulation of illumination in a sequence representing a full day. Simply switching from "night" (minimal lighting) to "morning" (relatively bright levels of illumination) is unnatural because in reality there is a gradual transition between night and day. Sudden change such as this are unsettling for passengers and are therefore undesirable.

SUMMARY OF THE INVENTION

The present invention aims to provide an improved lighting system for an aircraft cabin.

In its broadest sense the invention provides a lighting system in which multiple light sources having different lighting characteristics are controlled by a central controller such that the combined light emitted from the sources creates one of a set of predetermined different lighting scenes.

According to one aspect of the invention there is provided a lighting system for an aircraft cabin, the system comprising: plural illuminating units for distribution about a cabin, each illuminating unit comprising one or more variable light sources providing light of a known characteristic different to that of the sources in other illuminating units and being energisable independently of other illuminating units; and a controller for controlling energisation of the plural illuminating units, the controller being operable to create different predetermined combinations of energisations of said plural illuminating units so that in use a desired lighting scene is created within the cabin by the energised illuminating units, and the controller being arranged to effect a gradual transition to the energisations of the illuminating units when changing from one predetermined combination of energisations to another so that there is a corresponding gradual change between scenes created in the cabin.

According to another aspect of the invention there is provided a method of lighting an aircraft cabin, the method comprising: distributing plural illuminating units about a cabin, each unit comprising one or more variable light sources providing light of a known characteristic different to that of the sources in other illuminating units and being energisable independently of other illuminating units; and controlling energisation of the plural illuminating units in plural different modes each comprising a predetermined combination of energisations of said plural illuminating units so that a desired lighting scene is created within the cabin by the energised illuminating units, and wherein a gradual transition to the energisations of the illuminating units is effected when changing from one mode to another so that there is a corresponding gradual change between scenes created in the cabin.

The above and further features of the invention are set forth with particularity in the appended claims and together with advantages thereof will become clearer from consideration of the following detailed description of an exemplary embodiment of the invention given with reference to the accompanying drawings.

DETAILED DESCRIPTION OF PREFERRED EMBODIMENTS

Figure 1:
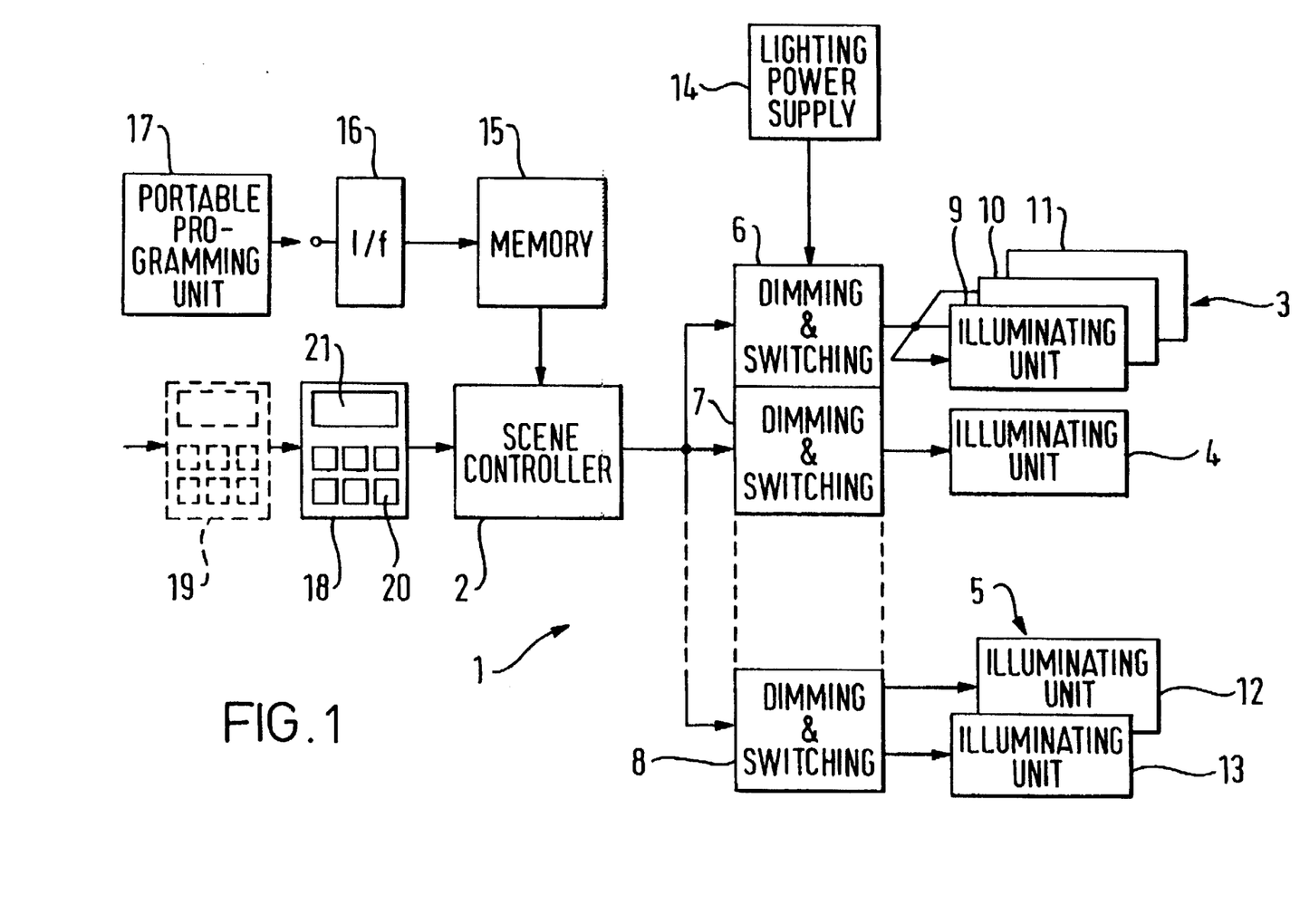
FIG. 1 is a schematic functional block diagram of an aircraft cabin lighting system embodying the invention.

Referring now to FIG. 1 of the accompanying drawings there is shown an aircraft cabin lighting system 1 comprising a scene controller 2 connected to control several independent lighting sections 3, 4, 5 via respective dimming and switching modules 6, 7, 8. Together the scene controller 2 and the switching modules 6, 7, 8 control the lighting sections 3, 4, 5 to create different lighting scenes within the cabin. Each lighting section 3, 4 or 5 comprises one or more illuminating units 9, 10, 11, 12 or 13 which, as will be described in greater detail hereinafter, are distributed about the aircraft cabin (not shown) to enable a desired lighting ambience to be created within the cabin. The dimming and switching modules 6, 7, 8 under the control of the controller 2 transfer power from a lighting power supply 14 to their respective lighting sections 3, 4, 5.

A memory 15 associated with the scene controller 2 stores data defining several different lighting scenes in which a given lighting ambience is created in the cabin (hereinafter referred to as a lighting scene). The data in the memory 15 is input via a suitable interface 16 from a portable programming unit 17 which enables data defining new lighting scenes to be created and defined off-line (i.e. away from the aircraft in which the system is fitted) and subsequently to be down-loaded into the memory 15 at a convenient time. The memory 15 includes a backup power supply (not shown) which enables data including data defining each lighting scene to be retained therein for a prolonged period (e.g. one month) in the event that power is removed from the system.

The scene controller 2 may be arranged so that it automatically progresses through a predetermined sequence of lighting scenes within a predetermined period of time. However, the exact timing of any given flight is always uncertain and may be delayed or extended in duration for all manner of different reasons. Progressing automatically through a predetermined time related sequence of different scenes therefore could result in a transition between lighting modes at an inappropriate time during a flight. For example, lights might be dimmed part-way through a meal period instead of at the end of the period if the flight is delayed for some reason. Thus, fully automatic lighting control is, in practice, undesirable and the system 1 therefore includes one or more control panels 18, 19 by which manual selection of the lighting scenes may be effected. Each of the control panels 18, 19 comprises a key or switch pad 20 and a display panel 21. Alternatively the key pad may be disposed with by using a touch sensitive display panel. The scene controller 2 is arranged to respond to manipulation of one or more of the switches 20 (or the touching of the display panel) to change from one predetermined lighting scene to another.

The data stored in the memory 15 defines a large number of different lighting scenes including: "nighttime" and "cinema" scenes in which only minimal background illumination is required in the cabin; an "evening meal" scene in which soft lighting is required; a "breakfast" scene in which higher levels of illumination are provided; a "daytime" scene; and an "emergency" scene in which at least emergency directors and exit signs are illuminated and preferably all lighting is energised.

Whilst fully automatic control is not desirable, it is nevertheless desirable to limit the degree of control that the cabin crew have over the lighting. On a short domestic flight it may be inappropriate have "night" or "cinema" scenes available, and on long-haul flight it may be inappropriate to follow a "night" scene by an "evening meal" scene. The scene controller can be configured to prevent undesirable scenes and undesirable transitions from one scene to another from being selected. The scene controller 2 may be configured to restrict the selection of scenes such that the available scenes may only be selected in a predetermined order or greater flexibility may be provided by enabling the cabin crew operating the system via the control panels 18, 19 to select any desired scene from the range of scenes available for a given flight. The data pertaining to such restrictions is, of course, stored in the memory 15.

At the beginning of a flight data pertaining to the nature of the flight, e.g. domestic, short-haul or long-haul and time of flight is input by the cabin crew via a control panel 18 or 19 in response to prompts generated by the controller 2 and displayed on the display panel 21. This set-up procedure serves to establish which lighting scenes may be required during the flight and, if appropriate, the order in which they should be made available for selection.

In order to achieve different scenes of illumination, the system 1 is provided with several different types of illuminating units 9 to 13. It will be appreciated by those possessed of the appropriate skills that a wide range of different light sources are readily available on the open market. Similarly, various means, per se well known, may be employed in the distribution of light about the aircraft cabin.

Figure 2:
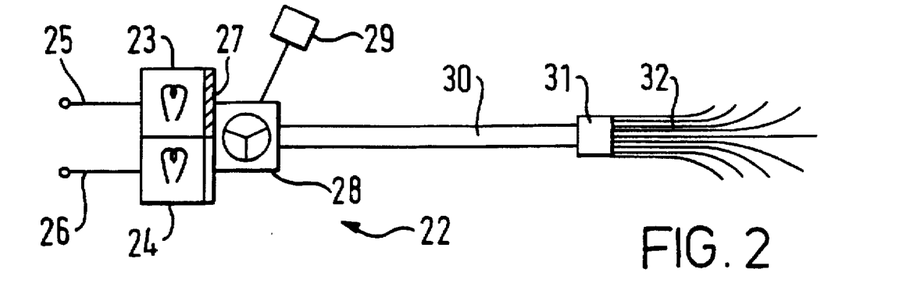
FIG. 2 is a schematic block diagram of an exemplary illuminating unit.

FIG. 2 of the accompanying drawings shows an exemplary illuminating unit 22 comprising two lamps 23, 24 which are energised by a dimming and switching unit, e.g. unit 8 in FIG. 1, via respective energising lines 25, 26. Two lamps 23, 24 are provided in order to increase the reliability of the illuminating unit and, naturally, further lamps may be provided if so required. The illuminating unit 22 further comprises a shutter element 27 disposed between the lamps 23, 24 and a plural coloured filter 28. In the event that one of the lamps fails, the failure is sensed by means (not shown) in the dimming and switching unit and the other lamp is then energised and the shutter moved to expose the other lamp by the dimming and switching unit. The coloured filter 28 is driven by a motor 29 which causes the filter to be rotated so that light of a desired colour is output therefrom. Alternatively a colour changing liquid crystal panel may be used in place of the rotatable filter 28 to effect colour changes to the light emitted from the unit. Light from the filter 28 is input to an optical element 30 along which the light is transmitted to a junction 31 where the light is provided to multiple fibre optics 32 for distribution about the cabin. The optical element 30 may be a light transmitting rod or it may be a flexible bundle of fibre optics. Each of the multiple fibre optics 32 may be either an end emitting fibre or a side emitting fibre. It will be appreciated that the different characteristics of emission of the fibres enable desired lighting ambiences to be produced within the cabin by selective energisation fibres at predetermined locations about the cabin.

Figure 3:
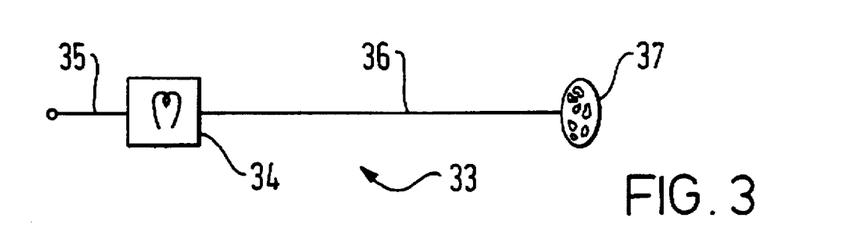
FIG. 3 is a schematic block diagram of another exemplary illuminating unit.

Another exemplary illuminating unit 33 is shown in FIG. 3 of the accompanying drawings. The unit 33 comprises a lamp 34 which is energised by a dimming and switching unit, e.g. unit 7 in FIG. 1, via an energising line 35. Of course the single lamp 34 may be replaced by plural lamps such as illustrated in FIG. 2. The plural lamps may be differently coloured in order that different coloured light can be selectively emitted from the illuminating unit for example by way of a shutter such as illustrated in FIG. 2 or by arranging the plural lamps to be rotatable past an aperture in a housing (not shown) containing the lamps. As shown, the lamp 34 is connected to a single light-carrying medium 36 which may be a single fibre optic for example.

The illuminating unit 33 further comprises a so-called gobo 37 which is a thin metallic disc into which a pattern has been etched. The gobo 37 may, for example, have a random pattern of holes etched into it so that when light is transmitted therethrough it is seen in the cabin as a dappled effect akin to that of sunlight through trees. Such a pattern helps to break up the harsh lines within a aircraft cabin and several units may be disposed in the cabin to provide a relaxing scene for example during meal times or say an "evening" scene. Alternatively or additionally, the gobo may contain a pattern corresponding to a company logo.

Figure 4:
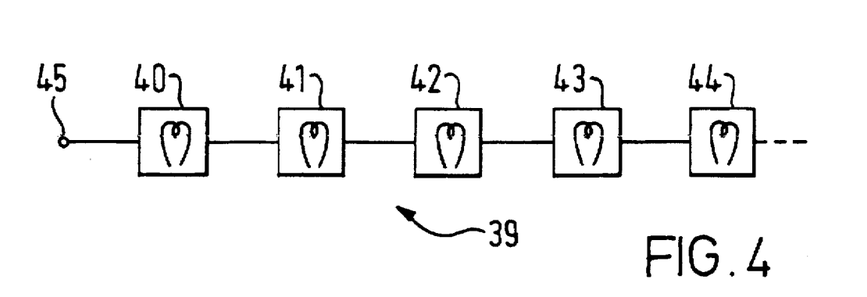
FIG. 4 is a schematic block diagram of a further exemplary illuminating unit.

A further exemplary illuminating unit 39 is shown in FIG. 4 of the accompanying drawings. This exemplary illuminating unit comprises multiple lamps 40 to 44 which are energised by a respective dimming and switching unit via line 45. The lamps 40 to 44 may, for example, be up-lighters or down-lighters mounted at the ceiling and/or walls of the aircraft cabin so that light output directly therefrom is reflected from said ceiling or walls or ceiling to produce a soft back lighting effect. Alternatively, the lamps 40 to 44 may serve as multiple sources for multiple light distribution arrangements similar to those exemplified in FIGS. 2 and 3 of the accompanying drawings.

Figure 5:
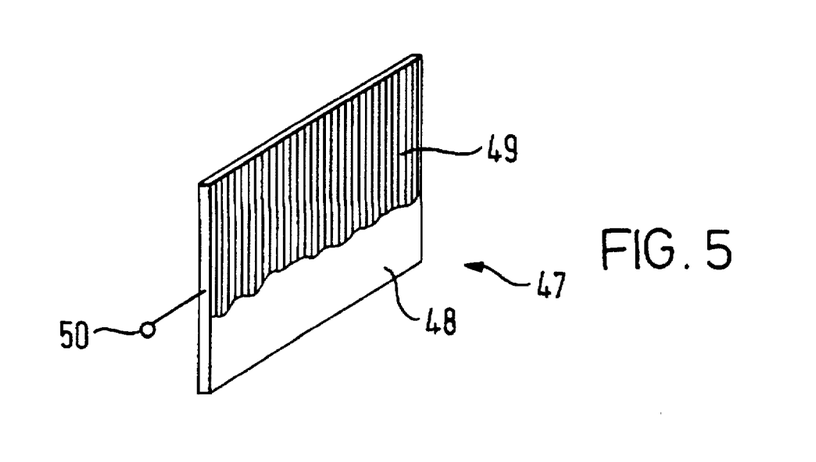
FIG. 5 is a schematic block diagram of another exemplary illuminating unit.

Another exemplary illuminating unit 47 is shown in FIG. 5 of the accompanying drawings and comprises a liquid crystal panel 48 having a predetermined pattern 49 formed thereon. It will be appreciated that a liquid crystal panel does not in itself serve as a source of illumination, but can be used as a screen to block light from other sources. Such a panel or panels can be installed in the aircraft cabin to serve as partitioning units dividing the cabin into different areas. For example, the liquid crystal panel 48 could be installed between the area of the cabin assigned to business class travellers and the area of the cabin assigned to economy class travellers. During take off and landing the screen could be rendered transparent and during normal flight the screen could be rendered opaque therefore separating, as regards visibility, the differently designated areas of the cabin. Alternatively or additionally, the liquid crystal may contain a pattern corresponding to a company logo or other graphical representation which is made visible at appropriate times by the scene controller 2. As with the previously described illuminating units, the liquid crystal display panel is energised via a line 50 by a respective dimming and switching unit.

Figure 6:
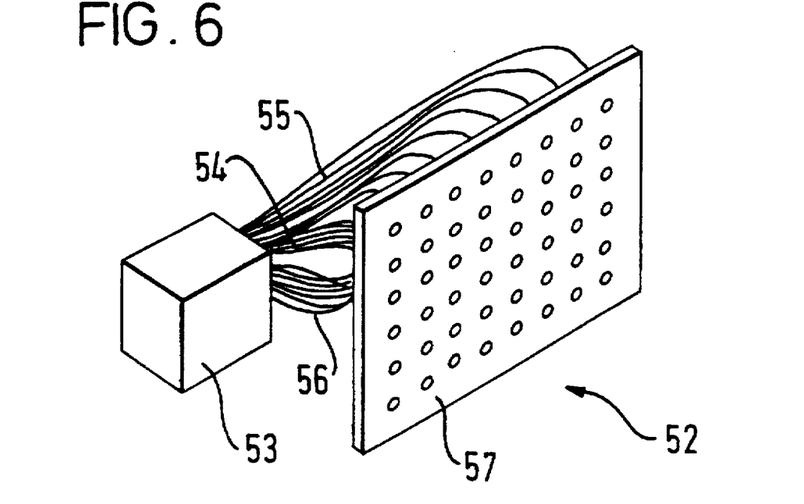
FIG. 6 is a schematic block diagram of a further exemplary illuminating unit.

A further exemplary illuminating unit 52 is shown in FIG. 6 of the accompanying drawings as comprising a light source 53 from which plural bundles 54 to 56 of multiple fibre optics connect to a display panel 57. The end of each fibre optic terminates at a respective hole 58, 59 formed in the panel 57. Thus, the ends of the fibre optics together provide multiple points of light on the display pane 57 when the display panel is viewed from the front. Several such display panels can be sited at various locations within an aircraft cabin for example bulkheads, walls and ceilings to provide patterns of light thereat. The source may comprise multiple lamps and a variable filter such as shown in FIG. 3, or multiple lamps of different colours such as shown in FIG. 4 selectable to produce colour varying patterns on the display panel, or a single lamp such as shown in FIG. 3 to produce a uniform pattern on the panel. Although shown as a planar surface, it will be appreciated that the panel 52 may be contoured to match the surface of an existing wall within the aircraft cabin, if so desired.

Figure 7:
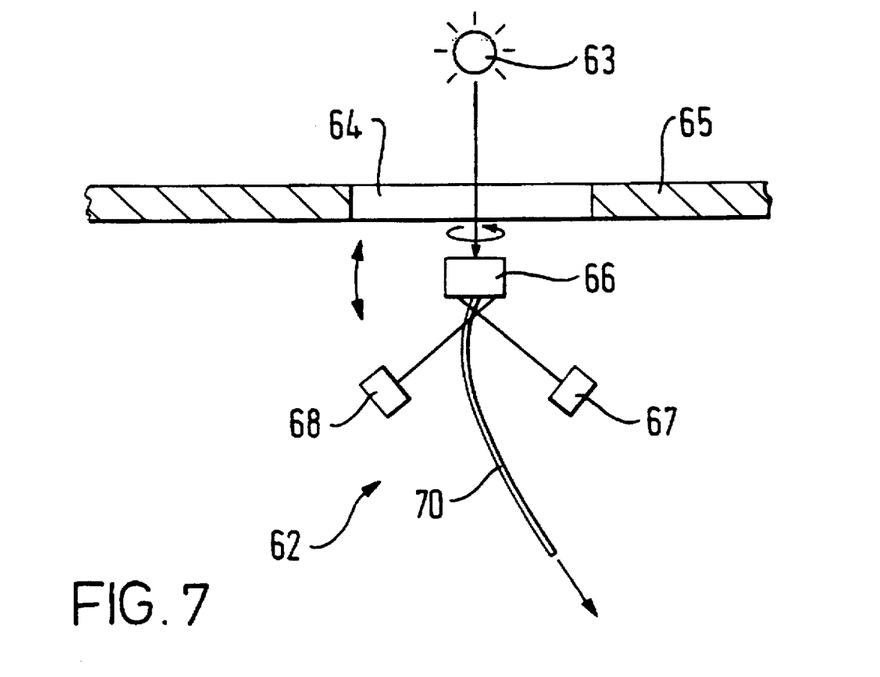
FIG. 7 is a schematic block diagram of an alternative light source.

FIG. 7 of the accompanying drawings illustrates an alternative light source in the form of a sunlight capturing unit 62. The unit is intended to be mounted at the outer surface of the aircraft so as to capture light from the sun 63 via a transparent window 64 provided in the outer skin 65 of the aircraft. A gimballed light capturing unit 66 beneath the transparent window is positioned by way of two positioning motors 67, 68 controlled by way of a sun tracking device (not shown). The unit 66 is continuously positioned by the motors 67, 68 so that light from the sun 63 is captured by the unit 66 and from there is directed into a light transmitting medium such as an optical fibre or optical rod 70. It will, of course, be appreciated that this alternative light source 62 can only be used during the daytime, and that in practice such a unit may be used to provide low background lighting when a film is being shown in the cabin, for example. At night the light capturing unit 66 can be directed toward an internal light source (not shown) in order to maintain the same background lighting scene in the cabin after sunset.

The various devices and units shown in FIGS. 2 to 7 of the accompanying drawings are merely exemplary and are not intended to be limiting in any way. It is well within the scope of a person possessed of the appropriate knowledge to select from the wide range of different illumination devices currently available in designing a lighting system by which different ambiences may be created within the cabin of aircraft.

Figures 8, 9:
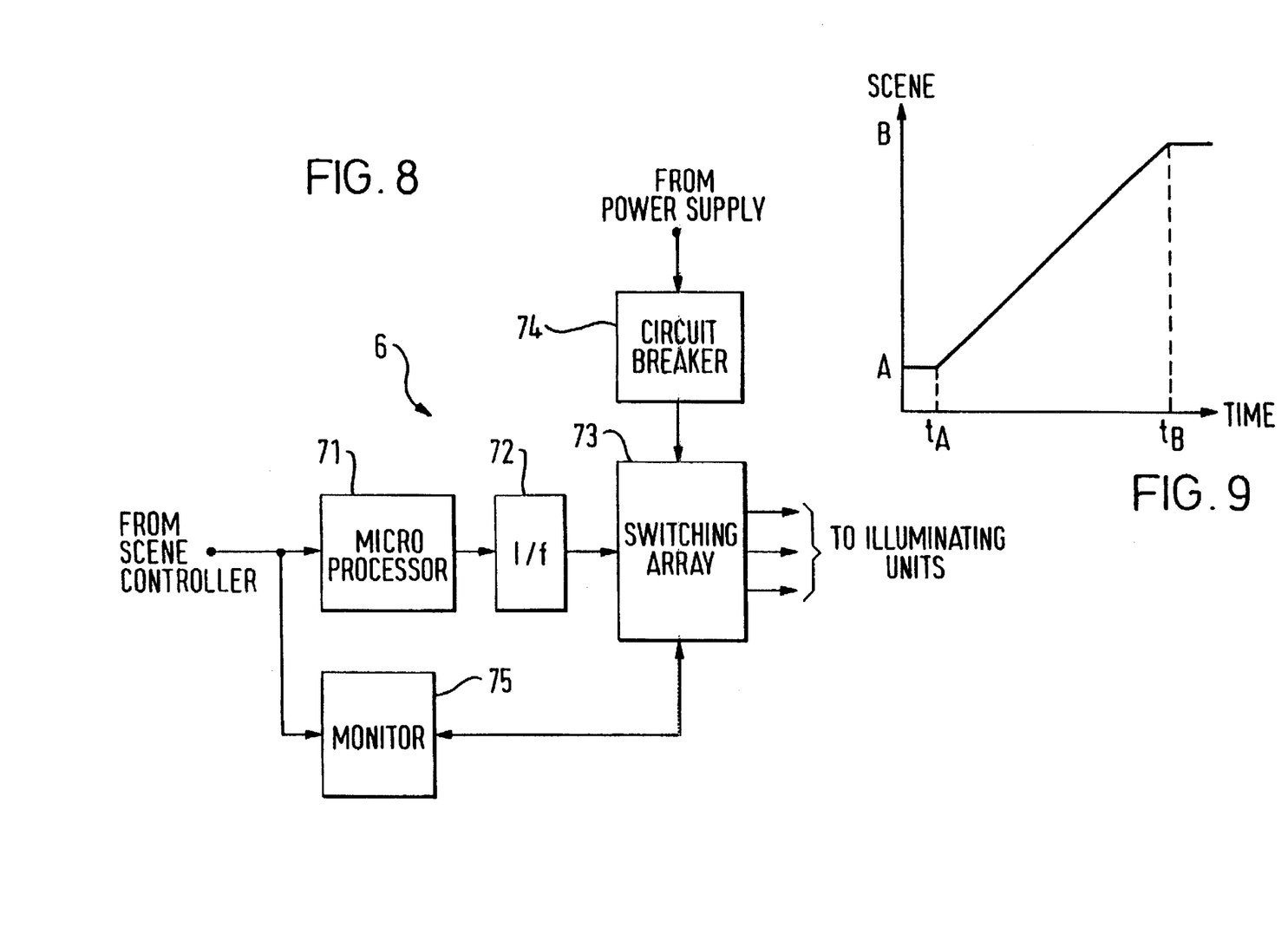
FIG. 8 is a schematic block diagram of a dimming and switching module.
FIG. 9 is a graph representing a transition between two different lighting modes.

Turning now to FIG. 8 of the accompanying drawings, each dimming and switching module generally comprises a microprocessor 71 which receives instructions from the scene controller 2 (see FIG. 1). The microprocessor 71 responds to said instructions by actuating, via an interface 72 comprising suitable digital to analog converters, an array of dimmer circuits, relays, switches, etc. (hereinafter referred to as a switching array 73) which outputs power for energisation of the illuminating unit or units associated with the dimming and switching module. A circuit breaker 74 is provided in each module as a safety device between the lighting power supply (see FIG. 1) and the switching array 73.

Each dimming and switching module also includes a monitor circuit 75 to provide back-up lighting in the event of the failure of the scene controller 2 or its associated units 17 to 19, or a failure by the microprocessor 71. In the event of a failure the monitor circuit 75 causes the switching array 73 to set to a default condition. In the default condition a given lighting scene will be maintained until such time as the failure is corrected. The default condition is not dependent on settings determined by the scene controller or the microprocessor, but is instead dependent on settings of switches and potentiometers within the monitor circuit 75 which determine which illuminating units are energised and the level of energisation thereof. Once a fault has been repaired, the scene controller 2 is arranged automatically to cause each of the dimming and switching modules to change gradually from the default condition to a lighting scene which is either predetermined or selected by the cabin crew by way of the key pad 20. Typically, the transition between the default scene and the selected scene will take no more than five seconds to occur.

The dimming and switching modules are all mounted in a single switching rack (not shown) which provides the necessary connections between the scene controller 2, the lighting power supply 14, the lighting sections 3, 4, 5 and the dimming and switching modules 6, 7 and 8.

The lighting scenes which can be achieved by the system 1 depend on the specific type of illuminating units fitted in the aircraft cabin and the manner in which the scene controller is programmed to control energisation of the illuminating units. The scene controller 2 is capable of storing numerous different lighting scenes which are defined by a large number of discrete intensity levels for each illuminating unit and a fade time between lighting scenes from a few seconds to several minutes. A given lighting scene is defined as a set of intensity levels, one for each illuminating unit.

As depicted graphically in FIG. 9 of the accompanying drawings, when changing from one lighting scene (A) to another (B), the scene controller is arranged to change gradually the intensity level of each illuminating unit from the previous value to the new value. This results in a gradual change from the one lighting scene A at time $t_A$ to the other, scene B at time $t_B$. Typically a transitional period from $t_A$ to $t_B$ in the range 20 seconds to 5 minutes is acceptable in that the change is not immediately noticeable by an observer, but quicker or slower changes are possible if required.

Since the lighting scenes achievable by the system depend on the illuminating units installed in the cabin of the aircraft and to an extent depend also on other characteristics of the cabin, it is necessary to be able to program each system for the specific cabin in which it is installed. Programming of the system is effected by way of the portable programming unit 17 which connects to the interface 16 by way of a suitable data link such as an RS232 line. During system set up the person installing the system is able to try different combinations of illumination levels by inputting commands to the scene controller from the portable programming unit 17. The installer is able to modify the energisation level of each illumination unit for each scene and to vary the time taken for the system to change from one lighting scene to the next. The installer may also restrict access to scenes that are available for a long-haul flight when the aircraft is in fact to be commissioned for a domestic flight. The portable programming unit can also be used to give a name to each programmed scene, which name is displayed on the display screen 21 of the control panel 18 or 19 when the system is in use.

Where the display screen 21 is touch sensitive, the controller can be arranged to select a lighting scene in response to the portion of the screen containing the name of the scene being touched by a crew member.

The display of scene names facilitates use of the system by the cabin crew for example by enabling the crew to see which lighting scenes are available for selection during the flight, which lighting scene is currently being employed and so forth. The display is also useful in confirming to the crew that a new scene has been selected. Since it can take up to several minutes for the system to change from one scene to another it is important that the crew is given a positive indication that a transition to a new selected scene is under way. Such an indication is provided by the display screen 21.

The microprocessor 71 in each dimming and switching unit is arranged to store data relating to the operation of its illuminating unit or units. Operation of the illuminating units is monitored by the monitor circuit 75 which responds to failure of a lamp in a multiple lamp source by opening the shutter to another lamp or energising the other lamp, as described hereinabove with reference to FIG. 2. Such operations are reported to the microprocessor as they occur. The monitor circuit can also be arranged to test the illuminating units for fault conditions such as open circuit and short circuit conditions which indicate a failure of some kind. The data stored by the microprocessor 71 in each unit therefore includes an indication of lamp failures and the like which occur during a flight. The scene controller is arranged to interrogate the microprocessor 71 in each dimming and switching unit at a convenient time, for example at the end of a flight. Following this interrogation, which is user initiated, the scene controller outputs a status report either via the display screen 21 of a control panel 18, 19 or via the portable programming unit 17. Routine maintenance can then be carried out to make good any faults or failures that have occurred since the system was last serviced.

Having thus described the invention by reference to a preferred embodiment it is to be well understood that the embodiment in question is exemplary only and that modifications and variations such as will occur to those possessed of the appropriate knowledge and skills may be made without departure from the spirit and scope of the invention as set forth in the appended claims and equivalents thereof.

We claim:

1. A lighting system for an aircraft cabin which simulates natural lighting transitions within a daily cycle, the system comprising:

a first illuminating unit for distributing light about the cabin, said first illuminating trait comprising at least one first light source providing light of a first known characteristic;

a second illuminating unit for distributing light about the cabin, said second illuminating unit comprising at least one second light source providing light of a second known characteristic different than that provided by said first light source in said first illuminating unit, said first and second illuminating units being energizable and controllable independently of each other; and a controller for controlling energization of said first and second illuminating units, said controller being operable to create different predetermined combinations of energizations of said first and second illuminating units so that in use a first desired light scenic can be created within the cabin by energizing said first and second light sources of said first and second illuminating units to a respective first level of energization, and a second desired lighting scene can be created within the cabin by energizing said first and second light sources of said first and second illuminating units to a respective second level of energization, whereby different lighting scenes are created within the cabin at different times, and said controller being arranged to effect a gradual transition between said first and second levels of energization of said first and second light sources in said first and second illuminating units when changing between said first desired lighting scene and said second desired lighting scene so that there is a corresponding gradual change between said first and second desired lighting scenes which simulates natural illumination in a sequence representing at least a portion of a full day to create a lighting atmosphere in the cabin which is comfortable and natural to a passenger.

2. A lighting system as claimed in claim 1, wherein at least one of said first and second light sources in said first and second illuminating units comprises a plurality of lamps.

3. A lighting system as claimed in claim 2, wherein, if one of said plurality of lamps fails, another of said plurality of lamps can be selected.

4. A lighting system as claimed in claim 1, wherein at least one of said first and second light sources in said first and second illuminating units comprises means for varying an intensity of light emitted therefrom.

5. A lighting system as claimed in claim 1, wherein at least one of said first and second light sources in said first and second illuminating units comprises a means for varying a color of light emitted therefrom.

6. A lighting system as claimed in claim 5, wherein said means for varying said color comprises a color wheel having a plurality of different color filters.

7. A lighting system as claimed in claim 1, wherein at least one of said first and second illuminating units comprises a light transmitting rod.

8. A lighting system as claimed in claim 7, wherein said light transmitting rod is arranged to emit light substantially from a side wall thereof.

9. A lighting system as claimed in claim 7, wherein said light transmitting rod is arranged to emit light substantially from an end face thereof.

10. A lighting system as claimed in claim 1, wherein at least one of said first and second illuminating units comprises a fiber optic.

11. A lighting system as claimed in claim 10, wherein said fiber optic is arranged to emit light substantially from a side wall thereof.

12. A lighting system as claimed in claim 10, wherein said fiber optic is arranged to emit light substantially from an end face thereof.

13. A lighting system as claimed in claim 1, wherein at least one of said first and second illuminating units comprises a patterned light obstructing member for causing a section of said patterned light obstructing member in use to emit a pattern of shadow and light.

14. A lighting system as claimed in claim 13, wherein said pattern of said patterned light obstructing member is irregular.

15. A lighting system as claimed in claim 13, wherein said pattern of said patterned light obstructing member is graphical.

16. A lighting system as claimed in claim 13, wherein said patterned light obstructing member comprises a gobo.

17. A lighting system as claimed in claim 13, wherein said patterned light obstructing member comprises a liquid crystal screen.

18. A lighting system as claimed in claim 17, wherein said liquid crystal screen comprises a size sufficient to at least partly partition the cabin.

19. A lighting system as claimed in claim 1, wherein at least one of said first and second illuminating units comprises means for capturing natural light from outside the cabin for use as a respective one of said first and second light sources.

20. A lighting system as claimed in claim 1, wherein said controller comprises a memory for storing data defining each of said first and second desired lighting scenes and a processor for effecting operation of said controller in accordance with said stored data.

21. A lighting system as claimed in claim 20, further comprising:
means for generating said data off-line and for down loading said data to said memory.

22. A lighting system as claimed in claim 21, wherein said means for generating said data comprises a computer.

23. A lighting system as claimed in claim 20, wherein time of transition data defining a time of a transition from one scene to another lighting scene is stored in said memory.

24. A lighting system as claimed in claim 1, wherein said controller is further operable to create sets of scenes selectable for use during a given type of flight, wherein said sets of scenes contain predetermined ones of said different lighting scenes.

25. A lighting system as claimed in claim 24, further comprising:
a display for displaying information identifying different lighting scenes in a first set of scenes selected from said sets of scenes.

26. A lighting system as claimed in claim 25, further comprising:
user operable selecting means for selecting a scene from said first set of scenes, wherein said selected scene is to be created in the cabin.

27. A lighting system as claimed in claim 26, wherein said selecting means comprises an array of push buttons, said controller being responsive to actuation of said push buttons.

28. A lighting system as claimed in claim 26, wherein said display comprises a touch sensitive screen which serves as said a operable selecting means.

29. A method of lighting an aircraft cabin which simulates natural lighting transitions within a daily cycle, the method comprising the steps of:
installing in the cabin a first illuminating unit comprising at least one first light source providing light of a first known characteristic together with a second illuminating unit comprising at least one second light source providing light of a second known characteristic different than that provided by said first light source in said first illuminating unit, said first and second illuminating units being installed so as to be energizable and controllable independently of each other; and controlling energization of said first and second illuminating units to create different predetermined combinations of energizations of said first and second illuminating units so that a first desired lighting scene is created within the cabin when said first and second light sources of said first and second illuminating units are energized to a respective first level of energization and a second desired lighting scene is created within the cabin when said first and second light sources of said first and second illuminating units are energized to a respective second level of energization, whereby different lighting scenes are created within the cabin at different times, and wherein a gradual transition between said first and second levels of energization of said first and second light sources in said first and second illuminating units is effected when changing between said first desired lighting scene and said second desired lighting scene so that there, is a corresponding gradual change between said first and second desired lighting scenes which simulates natural illumination in a sequence representing at least a portion of a full day to create a lighting atmosphere in the cabin which is comfortable and natural to a passenger.

30. A method as claimed in claim 29, further comprising the steps of:
dividing the cabin into a plurality of zones each containing at least one of said first and second illuminating units; and
controlling the energization of at least one of said first and second illuminating units in each of said plurality of zones individually so as to create different lighting scenes for different zones within the cabin.

31. A method as claimed in claim 29, further comprising the steps of:
varying an intensity of light emitted from at least one of said first and second light sources.

32. A method as claimed in claim 29, further comprising the steps of:
varying a color of light emitted from at least one of said first and second light sources.

33. A lighting system for an aircraft cabin which simulates natural lighting transitions within a daily cycle, the system comprising:
a first plurality of illuminating units for distribution about a cabin, each of said first plurality of illuminating units comprising a first light source providing light of a first known characteristic;
a second plurality of illuminating units for distribution about the cabin, each of said second plurality of illuminating units comprising a second light source providing light of a second known characteristic different than said first known characteristic, wherein said first plurality of illuminating units are energizable independently of said second plurality of illuminating units; and
a controller for controlling an energization of said first plurality of illuminating units, said controller being operable to create different predetermined combinations of energizations of said first plurality of illuminating units so that in use multiple different lighting scenes and subsets of scenes containing predetermined ones of said multiple different lighting scenes are selectable for use during a given type of flight, wherein said multiple different lighting scenes are created within the cabin by energization of said first plurality of illuminating units in accordance with one of said different predetermined combinations of energizations, said controller being arranged to effect a gradual transition of energizations of said first plurality of illuminating units when changing from one predetermined combination of energizations to another predetermined combination of energizations so that there is a corresponding gradual change between said multiple different lighting scenes which simulates natural illumination in a sequence representing at least a portion of a full day to create a lighting atmosphere in the cabin which is comfortable and natural to a passenger.

34. A lighting system for an aircraft cabin which simulates natural lighting transitions within a daily cycle, the system comprising:

a first plurality of illuminating units for distribution about a cabin, each of said first plurality of illuminating units comprising a first light source providing light of a first known characteristic;

a second plurality of illuminating units for distribution about the cabin, each of said second plurality of illuminating units comprising a second light source providing light of a second known characteristic different than said first known characteristic, wherein said first plurality of illuminating units are energizable independently of said second plurality of illuminating units and at least one illuminating unit in said first and second plurality of illuminating units comprises means for capturing natural light from outside the cabin as one of said first and second light source; and a controller for controlling an energization of said first plurality of illuminating units, said controller being operable to create different predetermined combinations of energizations of said first plurality of illuminating units so that in use a desired lighting scene is created within the cabin by energization of said first plurality of illuminating units in accordance with one of said different predetermined combinations of energizations, and said controller being arranged to effect a gradual transition of energizations of said first plurality of illuminating units when changing from one predetermined combination of energizations to another predetermined combination of energizations so that there is a corresponding gradual change between scenes which simulates natural illumination in a sequence representing at least a portion of a full day to create a lighting atmosphere in the cabin which is comfortable and natural to a passenger.

* * * * *